(12) United States Patent
Mayo et al.

(10) Patent No.: US 7,380,174 B2
(45) Date of Patent: May 27, 2008

(54) VARIABLE WRITING THROUGH A FIXED PROGRAMMING INTERFACE

(75) Inventors: David T. Mayo, Boxborough, MA (US); Bradley G. Culter, Dallas, TX (US); Dennis Mazur, Worcester, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 627 days.

(21) Appl. No.: 10/952,463

(22) Filed: Sep. 28, 2004

(65) Prior Publication Data

US 2006/0075309 A1    Apr. 6, 2006

(51) Int. Cl.
*G06F 11/00* (2006.01)

(52) U.S. Cl. ............................. 714/40; 714/4; 714/36; 713/1; 713/2

(58) Field of Classification Search ............... 713/1, 713/2; 714/4, 36, 40
See application file for complete search history.

(56) References Cited

U.S. PATENT DOCUMENTS

| | | | |
|---|---|---|---|
| 5,504,905 A * | 4/1996 | Cleary et al. ............... | 713/100 |
| 6,567,897 B2 | 5/2003 | Lee et al. ................... | 711/153 |
| 6,725,317 B1 | 4/2004 | Bouchier et al. ........... | 710/312 |
| 2004/0034764 A1* | 2/2004 | Bulusu et al. ................. | 713/1 |
| 2004/0088531 A1* | 5/2004 | Rothman ....................... | 713/1 |
| 2004/0205776 A1* | 10/2004 | Harrington et al. ......... | 719/320 |

* cited by examiner

*Primary Examiner*—Robert Beausoliel
*Assistant Examiner*—Charles Ehne (57) ABSTRACT

Embodiments include writing a first data value to a validation variable through a fixed programming interface, where the validation variable includes multiple fields that correspond to multiple fields within a persistent variable. Contents of the validation variable are subsequently read through the fixed programming interface. When the validation variable contents include one or more differences from the first data value, one or more errors are identified.

30 Claims, 4 Drawing Sheets

VARIABLE WRITING THROUGH A FIXED PROGRAMMING INTERFACE

BACKGROUND

The hardware resources of some computer systems include multiple central processing units (CPUs) and input/output (I/O) resources. Firmware partitions, or "fPars," are entities that allow a system to be segmented into non-intersecting hardware resource subsets. A particular resource subset, or fPar, may be capable of booting an operating system, for example, provided that the fPar contains adequate hardware resources.

In some instances, a user may configure fPars through the use of a configuration utility. In response to user inputs that request configuration changes, the configuration utility may make changes to a persistent store that defines the configuration or, more specifically, that defines the fPars included in the configuration.

During the process of creating or updating an fPar, a user may attempt to make a configuration change that is invalid or illegal. For example, a user may attempt to add a given CPU to an fPar that does not exist.

Some prior configuration utilities are incapable of accurately indicating the root causes of some configuration errors. Accordingly, a user may perform several configuration modification attempts before arriving at a configuration that works. In addition, some prior configuration utilities are complex and platform-dependent, and thus are difficult to maintain and are not easily portable from one platform to another. Developers strive to create more portable, less complex, and more user-friendly configuration utilities.

BRIEF DESCRIPTION OF THE DRAWINGS

Like-reference numbers refer to similar items throughout the figures and.

DETAILED DESCRIPTION

Embodiments include methods of manipulating data through a fixed programming interface. As used herein, the term "fixed programming interface" means an interface that enables software on one side of the interface to manipulate and/or access information on a restricted side of the interface using procedural calls associated with the interface. The restricted-side information may include, for example, configuration information stored in non-volatile memory, and/or other information that is created, manipulated or maintained on a restricted side of a fixed programming interface. The programming interface is referred to as "fixed" in that the programming interface has been pre-defined.

In an embodiment, a method of updating configuration information includes a configuration utility requesting modifications to persistent configuration information through a fixed programming interface. Configuration information may include, for example, information used by an operating system or basic input/output system (BIOS) during operations and/or boot-up of a computer system. In an embodiment, the fixed programming interface is an interface that has been pre-defined using an Extensible Firmware Interface (EFI) specification. In other words, the fixed programming interface includes one or more interface functions defined in an Extensible Firmware Interface standard. In other embodiments, a fixed programming interface could be defined using a different specification or set of interface functions. Besides updating configuration information, other embodiments may include updating other types of restricted-side information. Although manipulation of configuration information through a fixed programming interface is discussed extensively in various example embodiments, below, it would be apparent to one of ordinary skill in the art, based on the description herein, how to modify the example embodiments to enable manipulation of other types of information through a fixed programming interface.

Configuration information may include firmware partition (fPar) information, which specifies "ownership" of various system resources. The fPars within a system may have allocated to them non-intersecting sets of system resources (e.g., processors, I/O modules, memory segments, and/or other resources).

An fPar configuration may be pre-configured in a computer system, and/or an fPar configuration may be modifiable by a user via a configuration utility. The user may request that the configuration utility perform various configuration-changing operations. For example, a user may request that the utility designate a particular processor as belonging to a particular fPar. Platform-specific configuration information may indicate whether or not the requested configuration change may be illegal or may compromise the system.

A configuration utility may directly access platform-specific configuration information in order to validate the user operation before updating fPar configuration information. The configuration utility may acquire the platform-specific configuration information from the core firmware, for example. If the user operation is not validated, then the fPar configuration is not updated. This approach depends on the use of a platform-dependent, configuration utility. Accordingly, such a configuration utility may not be readily portable across diverse platforms.

Another approach may be to allow the fPar configuration information to be written with invalid configuration information, and only to inform the user when the system actually attempts to use this invalid information. This approach may result in a user making numerous configuration change attempts before arriving at a valid fPar configuration. It is also possible that other callers to the function could read and propagate the invalid value.

In an embodiment of the described subject matter, which will be described in detail below, an fPar configuration is stored in a persistent variable. When a user makes a request to modify the fPar configuration, the configuration utility first writes to an "fPar validation variable." If, during the write procedure, platform-specific core firmware determines that the write is illegal for any of a number of reasons, a value is stored in the fPar validation variable that includes encoded error information. When the configuration utility discovers the encoded error information, the utility may inform the user of the error type (or types), and the user may try again to specify a valid configuration change. When the configuration utility discovers that no encoded error information has been stored in the fPar validation variable for a proposed configuration, the configuration utility may inform the user that the proposed configuration change is valid, and the persistent fPar configuration variable may then be written with the proposed configuration change.

As is described in detail below, embodiments include a configuration utility that may be virtually platform-independent and thus more easily portable between diverse platforms. Embodiments may enable a configuration utility to determine and report various types of errors associated with a proposed configuration, and/or to identify multiple errors that may occur with a single proposed configuration.

Figure 1:
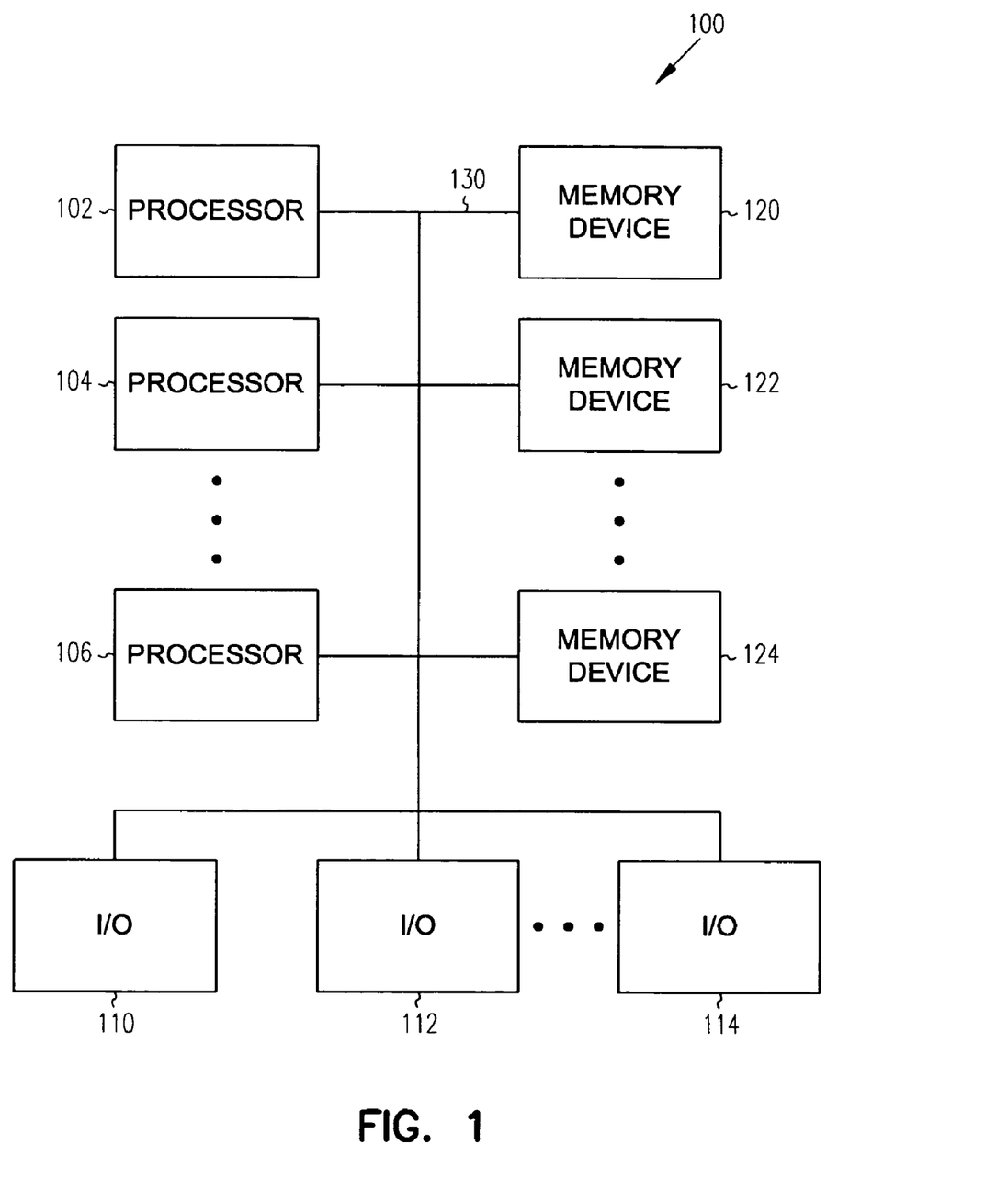
FIG. 1 is a simplified block diagram of a computer system, in accordance with an example embodiment.
Figure 2:
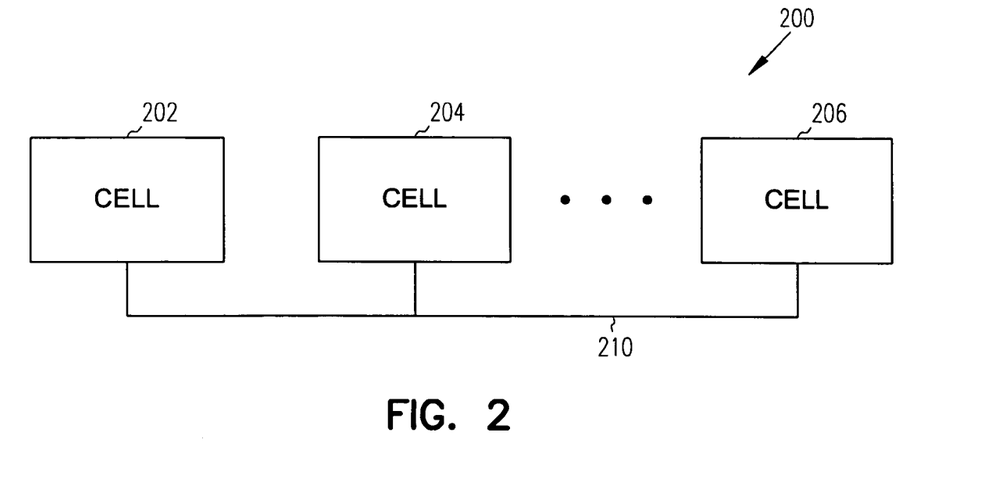
FIG. 2 is a simplified block diagram of a computer system, in accordance with another example embodiment.

Embodiments may be implemented in several types of computer system configurations. Two example computer system configurations are illustrated in FIGS. 1 and 2. One of ordinary skill in the art will understand, based on the description herein, how to adapt the various embodiments to different computer system configurations. Accordingly, it is to be understood that the configurations illustrated in FIGS. 1 and 2 are for the purposes of illustration, and not of limitation.

FIG. 1 is a simplified block diagram of a computer system 100, in accordance with an example embodiment. System 100 includes multiple, partitionable hardware resources. The term "partitionable resource," as used herein, means a computer resource that is assignable to an fPar.

These resources may include one or more processors 102, 104, 106, one or more I/O modules 110, 112, 114, one or more memory devices 120, 122, 124, and/or one or more other identifiable resources. For example, but not by way of limitation, other resources may include application specific integrated circuits (ASICs), multi-chip modules, multiple-core devices, addressable data storage areas, logic blocks, hardware subsystems, and/or any of a number of other identifiable resources.

Processors 102, 104, 106 may be a general-purpose or special-purpose processors. For example, but not by way of limitation, processors 102, 104, 106 may include a central processing unit (CPU) or a microprocessor. Alternatively, processors 102, 104, 106 may include a digital signal processor, a multi-media processor, or other types of processors. Although three processors 102, 104, 106 are illustrated in FIG. 1, embodiments may be implemented in systems that have more or fewer processors.

I/O modules 110, 112, 114 may include, for example, various serial and/or parallel I/O devices. I/O modules may include, for example, peripheral component interconnect (PCI) cards and/or other types of I/O devices or modules. Although three I/O modules 110, 112, 114 are illustrated in FIG. 1, embodiments may be implemented in systems that have more or fewer I/O modules.

Memory devices 120, 122, 124 may include, for example, discrete volatile or non-volatile memory devices (e.g., various types of random access memory (RAM) or read-only memory (ROM)), interleaved devices, global system memory (GSM) devices, and the like. Memory devices 120, 122, 124 may include addressable data storage areas (e.g., blocks of addressable storage locations). Other addressable data storage areas may also exist within system 100. For example, system 100 may include instruction caches within or external to a processor, processor registers and/or register banks, and the like.

Various resources of a system 100 may be interconnected via a single common bus 130, such as a Universal Serial Bus (USB), for example. Alternatively or in addition, sets of resources may be interconnected though other busses or apparatus capable of conveying messages between components.

FIG. 2 is a simplified block diagram of a computer system 200, in accordance with another example embodiment. System 200 includes multiple resource cells 202, 204, 206 interconnected through a common bus 210. Although three cells 202, 204, 206 are illustrated in FIG. 2, more or fewer cells may exist within a system.

In an embodiment, each cell 202, 204, 206 includes at least one partitionable resource. For example, a cell may include a circuit board containing one or more processors, one or more I/O modules, and one or more memory devices, among other things. Within each cell 202, 204, 206, resources may be interconnected via an internal bus (not shown), which is distinct from the common bus 210.

Some or all of a system's resources (or cells) may be designated as belonging to a particular fPar. In an embodiment, each fPar includes a non-intersecting set of resources, meaning that it is illegal for multiple fPars to own the same resource. For example, referring to FIG. 1, in a system having two fPars, a first fPar may own processor 102, I/O modules 110, 112, and memory device 120, and a second fPar may own processor 104 and memory device 122. Further, referring to FIG. 2, an fPar may own resources within a single cell (e.g., cell 202) and/or an fPar may own resources within multiple cells. At any time, an fPar may be empty, meaning that it is not designated to include any resources. In addition, from time to time, a resource may be free, meaning that it is not owned by an fPar.

An fPar may include a group of resources that are capable of running a copy of an operating system, for example. Accordingly, in a system that implements fPars, multiple copies of an operating system may be executed simultaneously. fPars may be defined for other purposes, as well.

As will be described in detail in conjunction with FIGS. 3-5, fPars may be defined in an "fPar database," which has restricted access. Although a configuration utility may be used to attempt to modify the fPar database, these modification attempts are made through a fixed programming interface.

Figure 3:
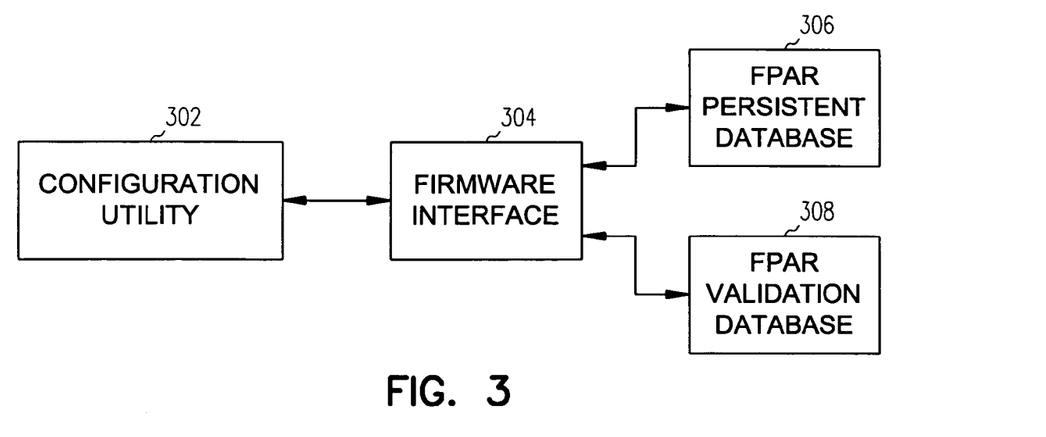
FIG. 3 is a conceptual block diagram illustrating a relationship between a configuration utility, a fixed programming interface, and a firmware partition persistent database, in accordance with an example embodiment.

FIG. 3 is a conceptual block diagram illustrating a relationship between a configuration utility 302, a fixed programming interface 304, an fPar persistent database 306, and an fPar validation database 308, in accordance with an embodiment. Configuration utility 302 is a software utility, which may be initiated by a user of a computer system. In an embodiment, configuration utility 302 may retrieve and present information to the user regarding a system's configuration. Through user inputs, the user may indicate that he or she would like to modify the configuration, for example, by enabling or disabling an fPar, and/or by adjusting the resources owned by one or more fPars.

In an embodiment, configuration utility 302 may attempt to satisfy a user request by manipulating the fPar persistent database 306 through fixed programming interface 304. More specifically, configuration utility 302 may attempt to write configuration changes to the fPar persistent database 306 using fixed programming interface procedure calls and semantics. As will be described in more detail later, a configuration utility may first write configuration changes to the fPar validation database 308 before writing configuration changes to the fPar persistent database 306.

In an embodiment, fPar persistent database 306 is saved as an EFI variable, referred to as "FPCFG" (abbreviation of "FPar ConFiGuration"). The FPCFG variable includes multiple fields, which may be modified independently or simultaneously. These fields specify the state of each of the fPars, and the fPar to which each assignable system resource belongs (if any), among other things. In an embodiment, a system may include from one to many fPars, with the number of possible fPars being limited to a maximum allowable number of fPars (e.g., 8). In addition, in various embodiments, the allowable numbers of assignable processors, I/O modules, memory devices, and/or other assignable resources may also be limited to maximum values.

In the next few paragraphs, an example embodiment of an FPCFG variable is given. It is to be understood that this example is given for purposes of understanding, and not of limitation. Although examples of various arrays and values are discussed, below, one of skill in the art would understand, based on the description below, that the information defined to specify a configuration could be differently arranged and characterized. Therefore, the example FPCFG variable arrangement described below is not to be taken as limiting the scope of the described subject matter.

In an embodiment, an FPCFG variable includes: 1) an fPar state array having a size of at least a maximum allowable number of fPars; 2) a processor ownership array having a size of at least a maximum allowable number of assignable processors; 3) an I/O ownership array having a size of at least a maximum allowable number of assignable I/O devices; and 4) a memory device ownership array having a size of at least a maximum allowable number of assignable memory devices. In other embodiments, some or all of these arrays may be excluded. In still other embodiments, arrays or representations of fPar ownership for other assignable resources may be included.

The fPar state array may include multiple records, where each record includes an fPar identifier (ID) field and an fPar state field. In an embodiment, an fPar may be in one of several states that include, but are not limited to, an enabled state, a disabled state, or an unspecified state. When an fPar is enabled, it means that the fPar exists, it is enabled, and it may hold ownership of assignable resources. When an fPar is disabled, it means that the fPar exists but is currently disabled. When an fPar is disabled, it may still hold ownership of assignable resources. When an fPar is in an unspecified state, it indicates that the fPar does not currently exist.

Each of the processor, I/O, and memory device ownership arrays also may have multiple records, where each record includes a resource ID field (e.g., a processor ID field) and an fPar assignment field. In an embodiment, the fPar assignment field may include a value identifying the fPar that currently owns the resource.

In an embodiment, fPar validation database 308 also is saved as an EFI variable, referred to as "V-FPCFG" (abbreviation of "Validation FPCFG"). In an embodiment, the V-FPCFG variable has a format that is substantially similar to the FPCFG variable. Accordingly, the V-FPCFG variable may include multiple fields, which may be modified independently or simultaneously.

A distinction between the V-FPCFG variable and the FPCFG variable is that the V-FPCFG variable is not used by other applications as a reflection of the system configuration, as is the FPCFG variable. Instead, the V-FPCFG variable is accessed, via the fixed programming interface, by a configuration utility during a process of validating a proposed new configuration. As will be described in detail below, when the configuration utility presents a proposed configuration to the firmware, the firmware validates the proposed configuration. If the proposed configuration is illegal or invalid, then the firmware encodes and stores error information within the V-FPCFG variable. The contents of this variable are received by the configuration utility, in an embodiment, and the configuration utility may identify potential issues with the proposed configuration from the encoded error information. The configuration utility may then present those potential issues to the user, so that the user may make more educated choices in proposing a next configuration.

In an embodiment, the V-FPCFG variable includes substantially similar fields as the FPCFG variable, and these fields may be arranged in substantially the same way. In an embodiment, when the firmware determines that a proposed assignment of a particular resource to a particular fPar is illegal for some reason, the firmware encodes information that indicates one of multiple types of errors, and inserts the encoded error information in the V-FPCFG field that corresponds to the resource. For example, if a user requests that processor 102 (FIG. 1) be assigned to fPar "4", but processor 102 is already owned by fPar "2", the firmware may determine that the assignment is illegal for the reason that the resource is owned by another fPar. The firmware may encode this reason type, and insert the encoded error type information in the field of the V-FPCFG variable's processor ownership array that corresponds to processor 102.

For some proposed configurations, multiple errors may be present. For example, a user may have proposed a configuration that would cause configuration errors for three processor assignments and one I/O assignment. Using embodiments of the described subject matter, the multiple error types may be encoded in the respective V-FPCFG fields that correspond to these resources. Accordingly, embodiments enable multiple potential errors with a proposed configuration to be identified and conveyed to the user. In other embodiments, the V-FPCFG variable may have a structure that is different from the structure of the FPCFG variable, but which still enables encoded error type information to be inserted into the variable in a manner that enables the configuration utility to identify the error type.

Figure 4:
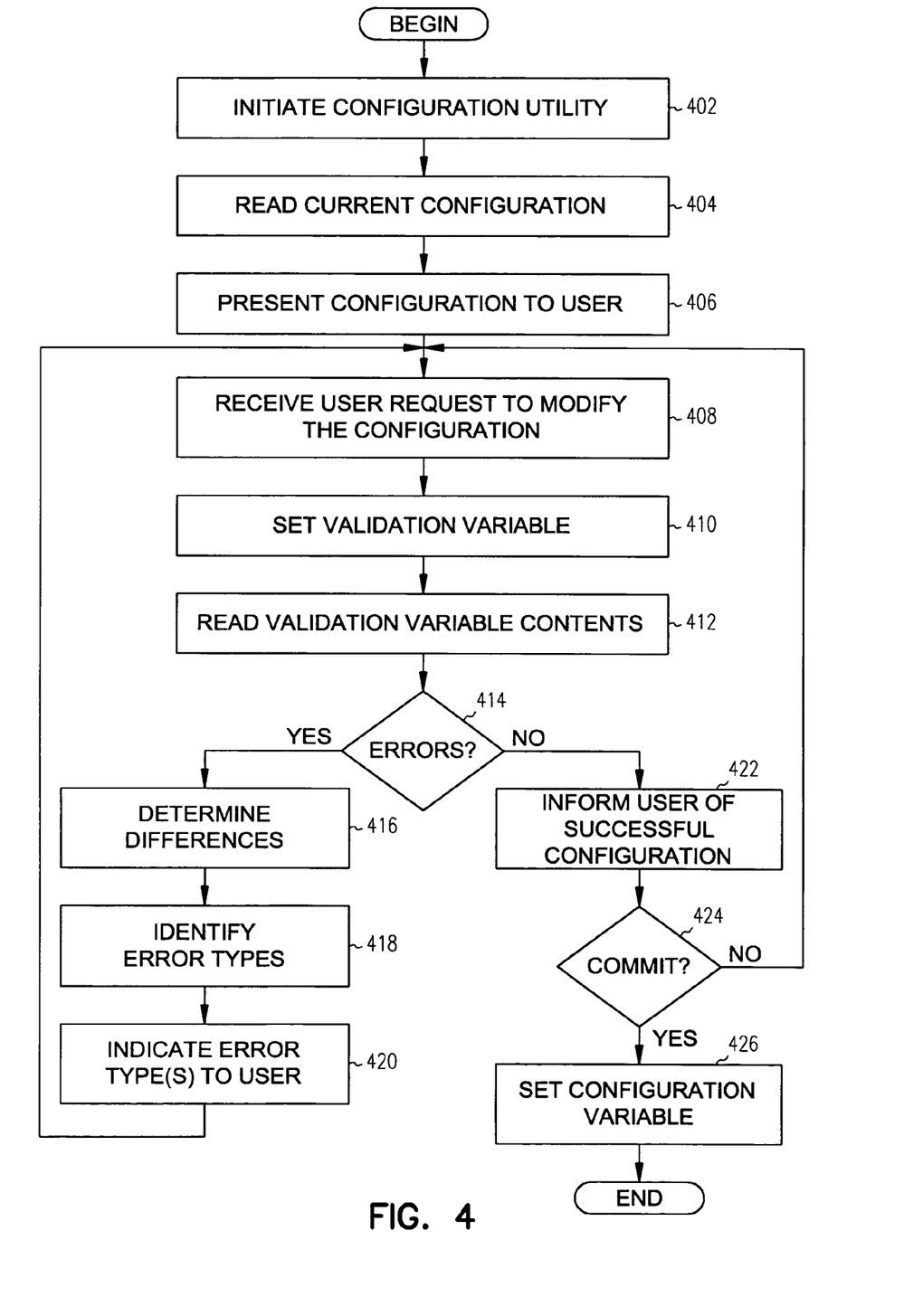
FIG. 4 is a flowchart of a procedure for a configuration utility to modify configuration information, in accordance with an example embodiment.

FIG. 4 is a flowchart of a procedure for a configuration utility to modify configuration information, in accordance with an embodiment. The method begins, in block 402, by initiating execution of a configuration utility. In an embodiment, the configuration utility is initiated by a user of a computer system that is running a configuration that is sought to be changed.

A configuration utility may present several options to the user, to guide the user in viewing and/or modifying a configuration. In an embodiment, the configuration utility may also present information describing a current configuration to the user automatically, or in response to a user request.

To present a current configuration to a user, the configuration utility may make a fixed programming interface call to read the current configuration, in block 404. In an embodiment, this includes issuing an EFI "GetVariable" call, which requests contents of the persistent configuration variable (e.g., FPCFG). When the contents of the variable are returned through the fixed programming interface to the configuration utility, the utility may present the current configuration to the user, in block 406.

A user may then decide to attempt to modify the current configuration. In response to user inputs, the configuration utility may receive a user request to modify the current configuration, in block 408. User modifications may include any one or more of the following types of changes, for example: 1) creating a new fPar; 2) enabling or disabling an existing fPar; and 3) changing fPar ownership of one or more resources.

In block 410, the configuration utility makes a fixed programming interface call to write the proposed configuration to a validation variable (e.g., V-FPCFG). In an embodiment, this includes issuing an EFI "SetVariable" call, which identifies the V-FPCFG variable as the write destination, and which includes data describing the proposed configuration.

As will be described in more detail in conjunction with FIG. 5, the firmware receives the information included in the SetVariable call, and validates the proposed configuration changes. When the firmware detects no errors with the proposed configuration, the firmware stores the information describing the proposed configuration in the V-FPCFG variable. When the firmware determines that any one or more proposed changes are illegal, the firmware encodes error information indicating the one or more illegal changes, and includes the encoded error information in the V-FPCFG fields that correspond to the potentially erroneous configuration changes. Accordingly, when a proposed configuration includes one or more changes that are illegal, the value stored in the V-FPCFG variable will not entirely reflect the proposed configuration. Instead, one or more fields may include encoded error information.

In block 412, the configuration utility makes a fixed programming interface call to read the contents of the validation variable. In an embodiment, this includes issuing an EFI "GetVariable" call, which identifies the V-FPCFG variable.

A determination is made, in block 414, whether the read-back validation variable contents include encoded error information. In an embodiment, this includes comparing the read-back validation variable with the proposed configuration. When, for example, the proposed configuration requested that processor 102 (FIG. 1) be assigned to fPar "4", but the validation variable record corresponding to processor 102 does not specify fPar "4" as the owner, an error may have been detected by the firmware. Accordingly, the validation variable record corresponding to processor 102 may include encoded error information within the fPar ownership field, rather than an identifier of fPar "4".

If encoded error information is present in the read-back validation variable contents, then differences between the proposed configuration and the read-back configuration are determined, in block 416. For example, a determination may be made that the contents of the read-back validation variable corresponding to processors 102 and 104 (FIG. 1) does not correspond to attempts to change fPar ownership of the processors.

In block 418, error types are identified. In an embodiment, where an error is present, encoded error information exists within a validation variable field. Error types may include, for example: 1) fPar not present (i.e., an attempt was made to allocate a resource to a non-existent fPar); 2) resource not present (i.e., an attempt was made to designate ownership of a non-existent resource); 3) resource in use (i.e., an attempt was made to designate ownership of a resource that is already owned by another fPar); and 4) out of range (i.e., an attempt was made to create or assign to an fPar that is out of range, meaning that the designated fPar is above the limit of allowable fPars in the system). More, fewer or different error types may be present in other embodiments. Accordingly, the above-listed error types are not meant to be limiting.

Each of the above error types, as well as other error types, may have specific encoded values, in an embodiment. For example, an error of the type "resource not present" may be encoded with "0xFE", and an error of the type "out of range" may be encoded with "0xFC". Accordingly, when the configuration utility encounters an encoded error type in a validation variable field, the configuration utility may determine the type of error present from the encoded error value. These encoded values are given for the purposes of explanation only, and not of limitation. Numerous other ways of encoding error types may be used in other embodiments.

In an embodiment, the configuration utility may then indicate the error type(s) to the user, in block 420. In an embodiment, a user-friendly indication may be given, such as a display message that states "You may not assign processor 102 to fPar 65, because fPar 65 is out of range. This platform has a range of 16 fPars." When multiple proposed configuration errors are detected, the configuration utility may cause multiple error messages to be displayed. This information may enable the user to propose another configuration that is less likely to be invalid.

The process then iterates. More specifically, a user may review the error information, and may request another proposed configuration, in block 408.

Ultimately, a user may propose a configuration for which no potential errors are detected, in block 414. When this occurs, the configuration utility may inform the user of a successful proposed configuration, in block 422. For example, the configuration utility may cause a display message to be produced, such as "Proposed configuration acceptable." The configuration utility may provide a way for the user to then commit the proposed configuration (e.g., by displaying a "Commit" icon).

In block 424, a determination is made whether the proposed configuration is to be committed. If not, the procedure iterates as shown, giving the user the ability to again propose configuration modifications. If it is determined that the configuration may be committed, then in block 426, the configuration utility makes a fixed programming interface call to write the proposed configuration to the persistent configuration variable. In an embodiment, this includes issuing an EFI "SetVariable" call, which identifies the FPCFG variable as the write destination, and which includes data describing the valid, proposed configuration. The procedure then ends.

Embodiments described above provide a framework for a configuration utility that may validate and commit proposed configuration changes without directly accessing platform-specific configuration information. Accordingly, such a configuration utility may be easily portable across diverse platforms. In addition, embodiments enable a rich array of configuration error information to be conveyed to the configuration utility and then to a user. This may enable a user to develop a valid configuration with less iteration.

Platform-specific aspects of modifying a configuration and specifying errors are handled by platform-specific core firmware, in an embodiment. The platform-specific core firmware is initiated, for example, in the context of a SetVariable call to modify V-FPCFG (e.g., as in block 410, FIG. 4). Within the context of the call, the platform-specific core firmware may validate proposed configuration information, identify proposed configuration errors, and imbed error information in the V-FPCFG variable, in an embodiment.

Figure 5:
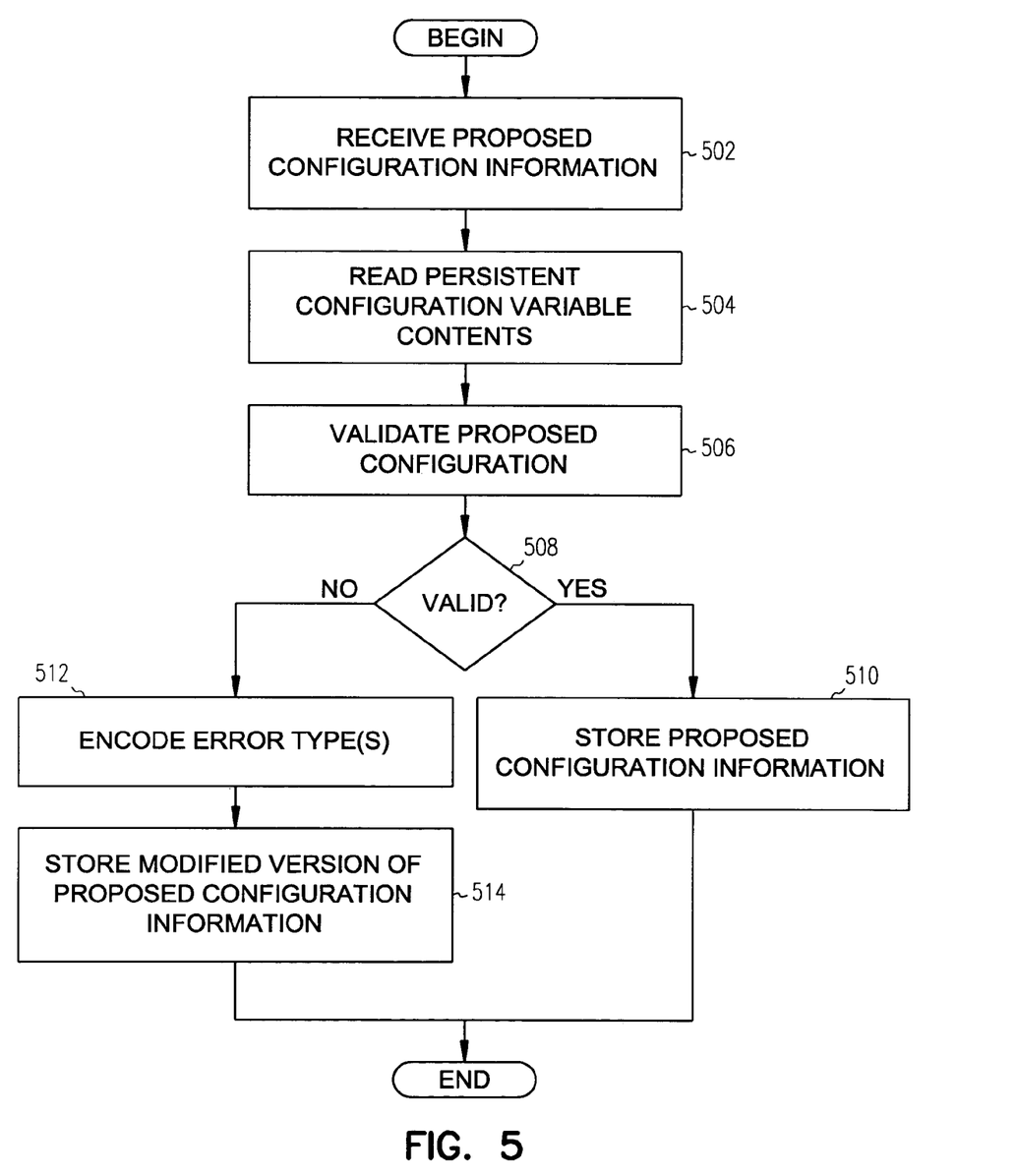
FIG. 5 is a flowchart of a procedure for validating a proposed configuration, in accordance with an example embodiment.

FIG. 5 is a flowchart of a procedure for validating a proposed configuration, in accordance with an example embodiment. In an embodiment, all or portions of the procedure may be performed by platform-specific core firmware that is initiated in response to a configuration utility SetVariable call through a fixed programming interface.

The method begins, in block 502, by receiving proposed configuration information through a procedure call from a configuration utility. In an embodiment, the procedure also receives a destination variable identifier (e.g., V-FPCFG).

In block 504, the contents of the fPar persistent variable, FPCFG, are read by the firmware. Using the contents of the fPar persistent variable, in block 506, the proposed configuration is validated by the firmware. In an embodiment, for at least those FPCFG variable fields for which changes are proposed, the procedure determines whether the changes will produce one or more configuration errors. Examples of some configuration error types were given above.

A determination is made, in block 508, whether the proposed configuration is valid. A proposed configuration is valid, in an embodiment, when no potential configuration errors are identified in block 506. When the proposed configuration is valid, then in block 510, the proposed configuration information is stored by the firmware into the identified destination variable (e.g., V-FPCFG), and the method ends.

When the proposed configuration is not valid, then in block 512, the one or more errors, which were determined in block 508, are encoded. Encoding of various error types is described above.

In block 514, the encoded error types are inserted into the contents of the validation variable. In an embodiment, the encoded error types are stored in the validation variable in locations that correspond to the configuration changes that produced the errors. The non-error-producing portions of the proposed configuration are also stored into the validation variable without modification, in an embodiment. The procedure call then returns to the configuration utility, and the method ends.

The foregoing description of specific embodiments reveals the general nature of the described subject matter sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the described subject matter embraces all such alternatives, modifications, equivalents and variations as fall within the spirit and broad scope of the appended claims.

The various procedures described herein can be implemented in hardware, firmware or software. A software implementation could use microcode, assembly language code, or a higher-level language code. The code may be stored on one or more volatile or non-volatile computer-readable media during execution or at other times. These computer-readable media may include hard disks, removable magnetic disks, removable optical disks, magnetic cassettes, flash memory cards, digital video disks, Bernoulli cartridges, RAMs, ROMs, and the like.

What is claimed is:

1. A method comprising:
   writing a first data value to a validation variable through a fixed programming interface, wherein the validation variable includes multiple fields that correspond to multiple fields within a persistent variable;
   subsequently reading contents of the validation variable through the fixed programming interface; and
   identifying one or more errors in configuration changes to firmware partitioned hardware resource subsets when the contents include one or more differences from the first data value.

2. The method of claim 1, further comprising:
   when the contents do not include one or more differences from the first data value, writing the first data value to the persistent variable through the fixed programming interface.

3. The method of claim 1, wherein:
   the first data value includes firmware partition configuration information;
   the persistent variable is a firmware partition configuration variable;
   the validation variable has a format that is substantially similar to a format of the firmware partition configuration variable; and
   the fixed programming interface includes an Extensible Fixed programming interface.

4. The method of claim 1, further comprising:
   prior to writing the first data value to the validation variable, receiving a user request to modify the persistent variable.

5. The method of claim 1, further comprising:
   identifying one or more variable storage error types from the one or more differences.

6. The method of claim 5, further comprising:
   indicating the one or more variable storage error types through a user interface.

7. The method of claim 5, wherein identifying the one or more variable storage error types comprises:
   evaluating the one or more differences, wherein the one or more differences include encoded error type information; and
   identifying the one or more variable storage error types from the encoded error type information.

8. A method comprising:
   Writing a first data value to a validation variable through a fixed programming interface, wherein the validation variable includes multiple fields that correspond to multiple fields within a persistent variable;
   subsequently reading contents of the validation variable through the fixed programming interface; and
   identifying one or more errors when the contents include one or more differences from the first data value,
   the one or more variable storage error types are identified from a group of error types consisting of a firmware partition not present type, a resource not present type, a resource in use type, and an out of range type.

9. A method comprising:
   receiving a user request to modify a firmware partition persistent variable;
   writing a first data value to a firmware partition validation variable through a fixed programming interface, wherein the first data value represents the user request and includes firmware partition configuration information;
   subsequently reading contents of the firmware partition validation variable through the fixed programming interface; and
   identifying one or more errors when the contents include one or more differences from the first data value.

10. The method of claim 9, wherein:
    the fixed programming interface includes one or more interface functions defined in an Extensible Firmware Interface standard.

11. The method of claim 9, wherein the firmware partition validation variable has a format that is substantially similar to a format of the firmware partition persistent variable.

12. The method of claim 9, further comprising:
when the contents do not include one or more differences from the first data value, writing the first data value to the firmware partition persistent variable through the fixed programming interface.

13. The method of claim 9, further comprising:
identifying one or more configuration error types from the one or more differences.

14. The method of claim 13, further comprising:
indicating the one or more configuration error types through a user interface.

15. The method of claim 13, wherein identifying the one or more configuration error types comprises:
evaluating the one or more differences, wherein the one or more differences include encoded error type information; and
identifying the one or more configuration error types from the encoded error type information.

16. The method of claim 13, wherein identifying the one or more configuration error types comprises:
identifying the one or more configuration error types from a group of error types that includes a firmware partition not present type, a resource not present type, a resource in use type, and an out of range type.

17. A method comprising:
receiving, from a configuration utility, a first data value representative of resources that are firmware partition resources through a fixed programming interface;
receiving, from the configuration utility, a validation variable identifier through the fixed programming interface;
reading contents of a firmware partition persistent variable;
determining whether the first data value is valid, based on the contents; and
when the first data value is not valid, storing a second data value to the validation variable, wherein the second data value includes encoded error type information, which indicates one or more reasons why the first data value is not valid.

18. The method of claim 17, wherein:
the first data value includes firmware partition configuration information;
the validation variable has a format that is substantially similar to a format of the firmware partition persistent variable; and
the fixed programming interface includes one or more interface functions defined in an Extensible Firmware Interface standard.

19. The method of claim 17, further comprising:
when the first data value is valid, storing the first data value to the validation variable.

20. The method of claim 17, wherein determining whether the first data value is valid comprises:
evaluating the first data value to determine whether storing the first data value to the firmware partition persistent variable may result in one or more firmware partitioning errors; and
when storing the first data value would result in the one or more firmware partitioning errors, determining that the first data value is not valid.

21. The method of claim 17, further comprising:
when storing the first data value would result in the one or more firmware partitioning errors, identifying one or more error types of the one or more firmware partitioning errors.

22. The method of claim 21, wherein identifying the one or more error types comprises:
identifying the one or more error types from a group of error types that includes a firmware partition not present type, a resource not present type, a resource in use type, and an out of range type.

23. A computer readable medium having program instructions stored thereon to perform a method, which when executed within a computer system, result in:
writing a first data value to a validation variable through a fixed programming interface, wherein the validation variable includes multiple fields that correspond to multiple fields within a persistent variable;
subsequently reading contents of the validation variable through the fixed programming interface; and
identifying one or more errors in configuration changes to firmware partitioned hardware resource subsets when the contents include one or more differences from the first data value.

24. The computer readable medium of claim 23, wherein executing the program instructions further comprises:
when the contents do not include one or more differences from the first data value, writing the first data value to the persistent variable through the fixed programming interface.

25. The computer readable medium of claim 23, wherein:
the first data value includes firmware partition configuration information;
the persistent variable is a firmware partition configuration variable;
the validation variable has a format that is substantially similar to a format of the firmware partition configuration variable; and
the fixed programming interface includes one or more interface functions defined in an Extensible Firmware Interface standard.

26. The computer readable medium of claim 23, wherein executing the program instructions further comprises:
prior to writing the first data value to the validation variable, receiving a user request to modify the persistent variable.

27. The computer readable medium of claim 23, wherein executing the program instructions further comprises:
identifying one or more variable storage error types from the one or more differences.

28. An apparatus comprising:
multiple hardware resources that are partitionable into multiple firmware partitions;
a fixed programming interface;
a firmware partition persistent database, which includes information identifying multiple firmware partitions and firmware partition ownership of the multiple hardware resources; and
a configuration utility, which when executed, updates the firmware partition persistent database by writing a first data value to a validation variable through the fixed programming interface, wherein the validation variable includes multiple fields that correspond to multiple fields within the firmware partition persistent database, subsequently reads contents of the validation variable through the fixed programming interface, and identifies one or more errors when the contents include one or more differences from the first data value.

29. The apparatus of claim 28, wherein the multiple hardware resources include resources selected from a set of resources that include one or more processors, one or more input/output modules, and one or more memory devices.

30. The apparatus of claim 28, wherein the fixed programming interface includes one or more interface functions defined in an Extensible Firmware Interface standard.

* * * * *

UNITED STATES PATENT AND TRADEMARK OFFICE
CERTIFICATE OF CORRECTION

| | | |
|---|---|---|
| PATENT NO. | : 7,380,174 B2 | Page 1 of 1 |
| APPLICATION NO. | : 10/952463 | |
| DATED | : May 27, 2008 | |
| INVENTOR(S) | : David T. Mayo et al. | |

It is certified that error appears in the above-identified patent and that said Letters Patent is hereby corrected as shown below:

In column 10, line 46, in Claim 8, after "value," insert -- wherein --.

Signed and Sealed this

Twenty-ninth Day of July, 2008

JON W. DUDAS
*Director of the United States Patent and Trademark Office*